United States Patent [19]

Kachikian et al.

[11] Patent Number: 5,029,213
[45] Date of Patent: Jul. 2, 1991

[54] SPEECH PRODUCTION BY UNCONVERTED DIGITAL SIGNALS

[75] Inventors: Kevin R. Kachikian, Fountain Valley; William J. Arthur, Capistrano Beach; Richard P. Sprague, Westminster, all of Calif.

[73] Assignee: First Byte, Santa Ana, Calif.

[21] Appl. No.: 443,748

[22] Filed: Dec. 1, 1989

[51] Int. Cl.$^5$ .............................................. G10L 7/02
[52] U.S. Cl. ...................................................... 381/51
[58] Field of Search ................................ 381/51–53, 381/36–40; 364/513.5

[56] References Cited

U.S. PATENT DOCUMENTS

| 4,692,941 | 9/1987 | Jacks et al. | 381/52 |
| 4,805,220 | 2/1989 | Sprague et al. | 381/51 |
| 4,888,806 | 12/1989 | Jenkin et al. | 381/51 |

Primary Examiner—Dale M. Shaw
Assistant Examiner—John A. Merecki
Attorney, Agent, or Firm—Weissenberger, Peterson, Uxa & Myers

[57] ABSTRACT

Improved speech sounds are produced from an all-software speech generating program on a computer which does not have a digital-to-analog converter by polling a first timer connected to the computer's speaker until a time-out is found, then applying a sample time value to a second timer so connected, and restarting the first timer. This results in the generation of a variable-duty-cycle carrier without interfering with the computer's operation. In an alternative embodiment, the first timer is used to generate an interrupt at regular intervals, and a sample time value from a storage buffer is then applied to the second timer.

4 Claims, 3 Drawing Sheets

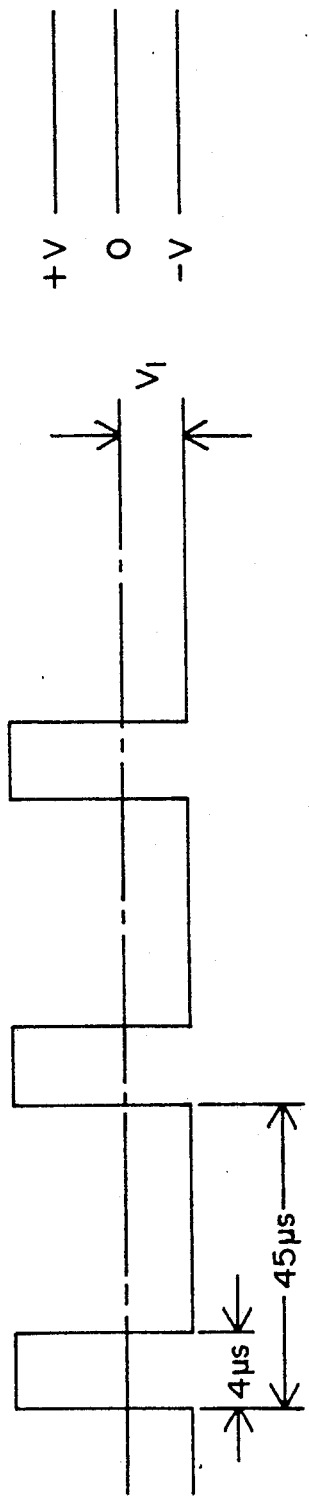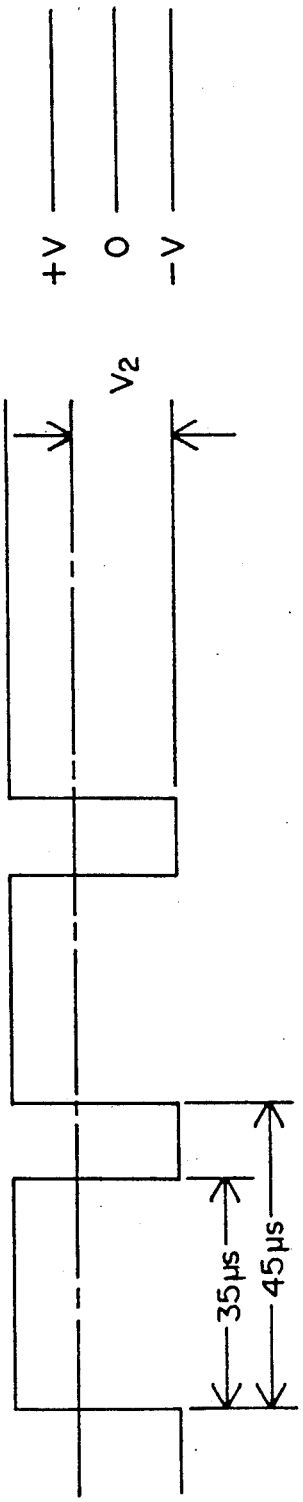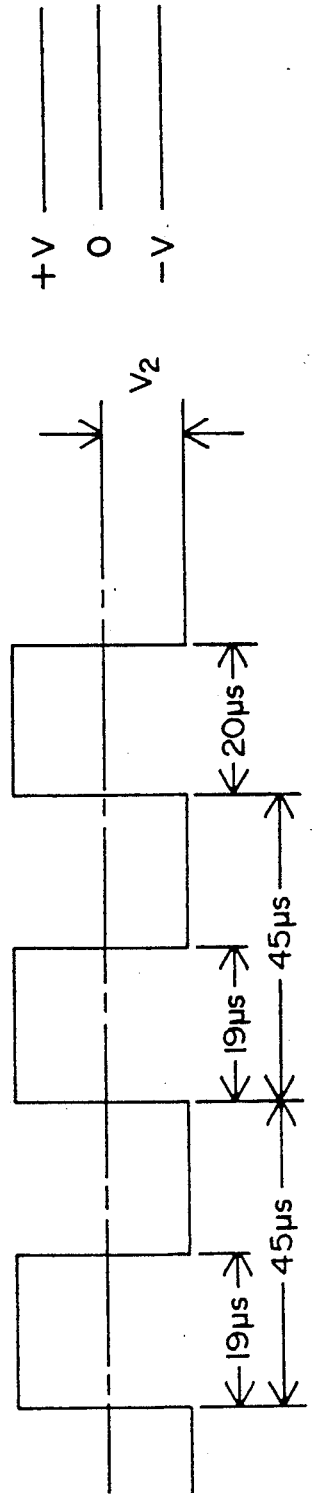

SPEECH PRODUCTION BY UNCONVERTED DIGITAL SIGNALS

FIELD OF THE INVENTION

This invention relates to methods of producing artificial speech from digitally encoded sounds, and specifically to improved methods which do not require conversion of the digital signals to analog form.

BACKGROUND OF THE INVENTION

Artificial speech is conventionally produced by generating a digital bit stream representing a sequence of amplitude samples which define sound waves in the time domain. This digital bit stream is conventionally converted into an analog signal by a digital-to-analog converter (DAC). When this analog signal is applied to a loudspeaker, the spoken words corresponding to the encoded text are heard.

A problem arises when such bit a stream is generated on a computer which does not have a DAC. Such computers are typically used for low-cost personal computer (PC) applications in which only single-frequency tones or games noises need to be produced. For tones such as the "bell" tone commonly used on personal computers, the central processing unit (CPU) of the computer produces a pulse train which alternately applies logic level "1" and logic level "0" voltages to the speaker at the desired tone frequency. For game sounds, a random waveform centered about zero is digitally generated and infinitely clipped (i.e. if the sign of a sample is positive, the applied logic level is "1", and if it is negative the applied logic level is "0").

If infinite clipping is performed on a waveform representing a spoken word, the sound produced by the speaker is marginally recognizable speech, but the vast amounts of spurious frequencies generated by the clipping make this process useless for applications in which speech quality is a factor.

U.S. Pat. No. 4,805,220 provides a solution to this problem. The teaching of this patent makes it possible to produce clear speech with DAC-less computers directly from a digital bit stream by switching the computer's speaker between logic levels "1" and "0" at an ultrasonic carrier rate and varying the "1"/"0" duty cycle at audio frequencies according to the speech signal to be produced. Carrier clicks or transients are prevented by generating the ultrasonic carrier continuously through silent periods as well as during phonemes.

In the invention of U.S. Pat. No. 4,805,220, speech generation in real time is made possible by interleaving the speech-generating CPU operations with the logic "1" and logic "0" operations of the CPU. This method is quite generally usable, but it is cumbersome and cannot take advantage of the enhanced capabilities of current computer technology.

SUMMARY OF THE INVENTION

The present invention improves upon the teaching of U.S. Pat. No. 4,805,220 by providing, in one of its aspects, a polling method of carrier generation. In this method, the switching of the computer's speaker can be accomplished without significant interference with the data processing functions of the computer, through the use of two timers.

In another embodiment, the present invention takes advantage of the higher operating speed of recent computer models by providing an interrupt method which eliminates the noise generation inherent in the polling method.

It is thus one object of the invention to produce a program-controlled modulation of the duty cycle of an ultrasonic square-wave carrier in a DAC-less computer with two timers by polling one timer until a time-out condition is found, then applying a sample time value to a second timer, and then restarting the first timer.

It is another object of the invention to produce the aforesaid duty cycle by picking up a sample time value from an output storage buffer at regular intervals determined by a first timer generating an interrupt, and applying that sample value to a second timer.

BRIEF DESCRIPTION OF THE DRAWINGS

FIG. 2a is a time-amplitude diagram showing the carrier duty cycle for the maximum negative audio signal level;

FIG. 2b is a time-amplitude diagram showing the carrier duty cycle for the maximum positive audio signal level;

FIG. 2c is a time-amplitude diagram showing the carrier duty cycle for the zero audio signal level.

DESCRIPTION OF THE PREFERRED EMBODIMENTS

Figure 1A:
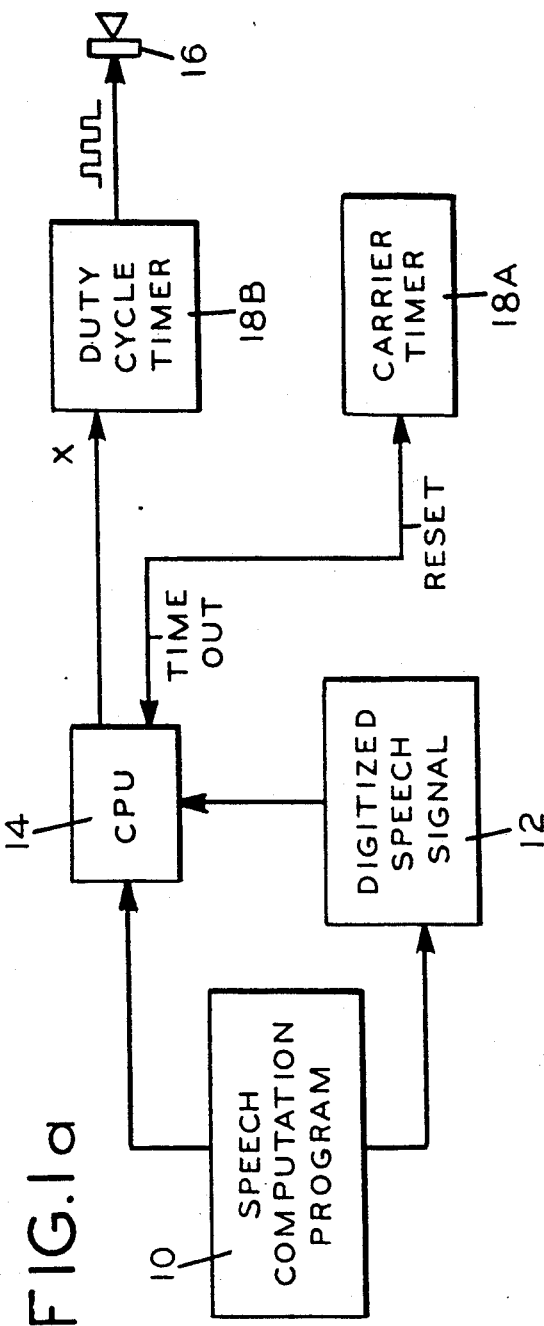
FIGS. 1a and 1b are block diagrams illustrating the hardware and software involved in the two preferred embodiments of the invention.
Figure 1B:
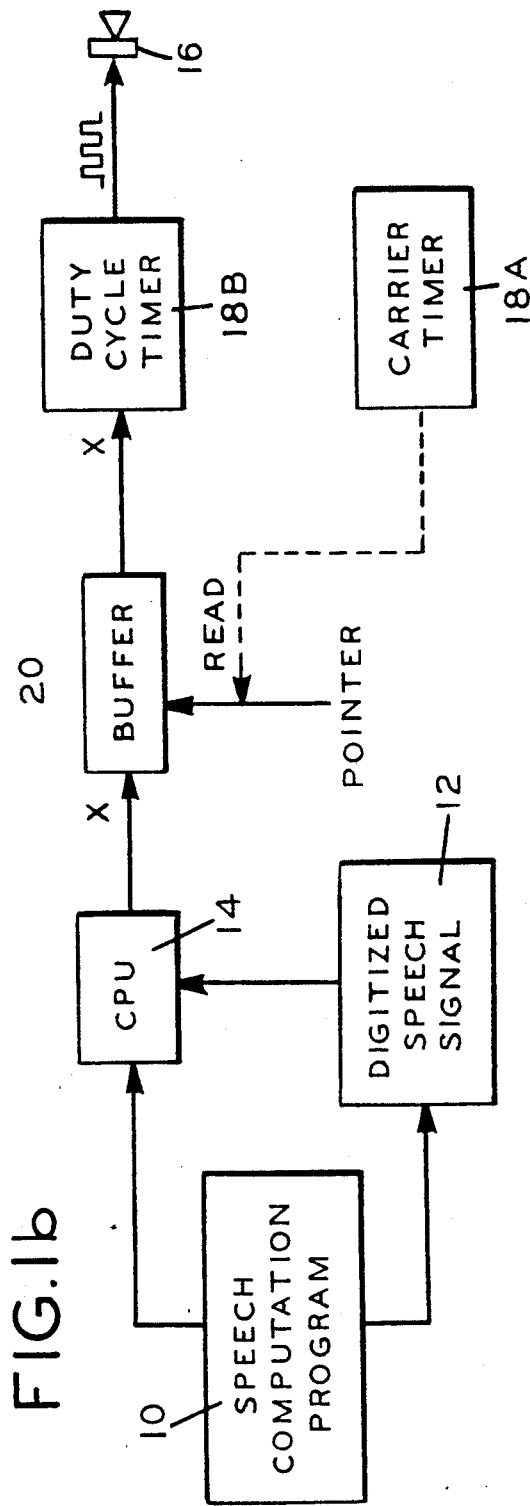

FIG. 1a and 1b illustrate the basic combination of software and hardware used in carrying out the two embodiments of the present invention. In an all-software text-to-speech conversion system such as that described in U.S. Pat. No. 4,692,941 (or, more specifically, in the system marketed under the name "Smooth-Talker" by First Byte, Inc. of Long Beach, Calif.), a software program 10 contained on a floppy disk produces an output train 12 of digitally encoded samples representing speech, at a fixed sampling rate of 11.1 kHz. The program 10 uses the CPU 14 to compute the samples of the speech output 12 from stored digitally encoded waveforms by means of algorithms not material to this invention.

In some PCs, the speaker 16 can be switched between logic levels "1" and "0" directly by the clock-calendar chip for the production of the "bell" tone. The clock-calendar chip is typically accessible through one of the input-output addresses to change the duration of the "1"-"0" pulse. In other PCs, the CPU initiates each logic "1" level pulse, but a separate pulse-timer-processor 18 initiates the "0" level after a length of time specified by the CPU. In still other PCs, the CPU switches the speaker between the "1" and "0" levels under direct program control.

Regardless of which of these speaker control methods any given PC uses, the system to which this invention relates causes the CPU, by appropriate software instructions, to initiate a logic "1" level at a fixed ultrasonic rate which, in the preferred embodiment, is 22.2 kHz, i.e. twice the sample rate of the speech output 12. The speaker is returned to the logic "0" level under program control in such a manner as to continuously vary the pulse length in accordance with the audio signal representing the speech.

Figure 3:
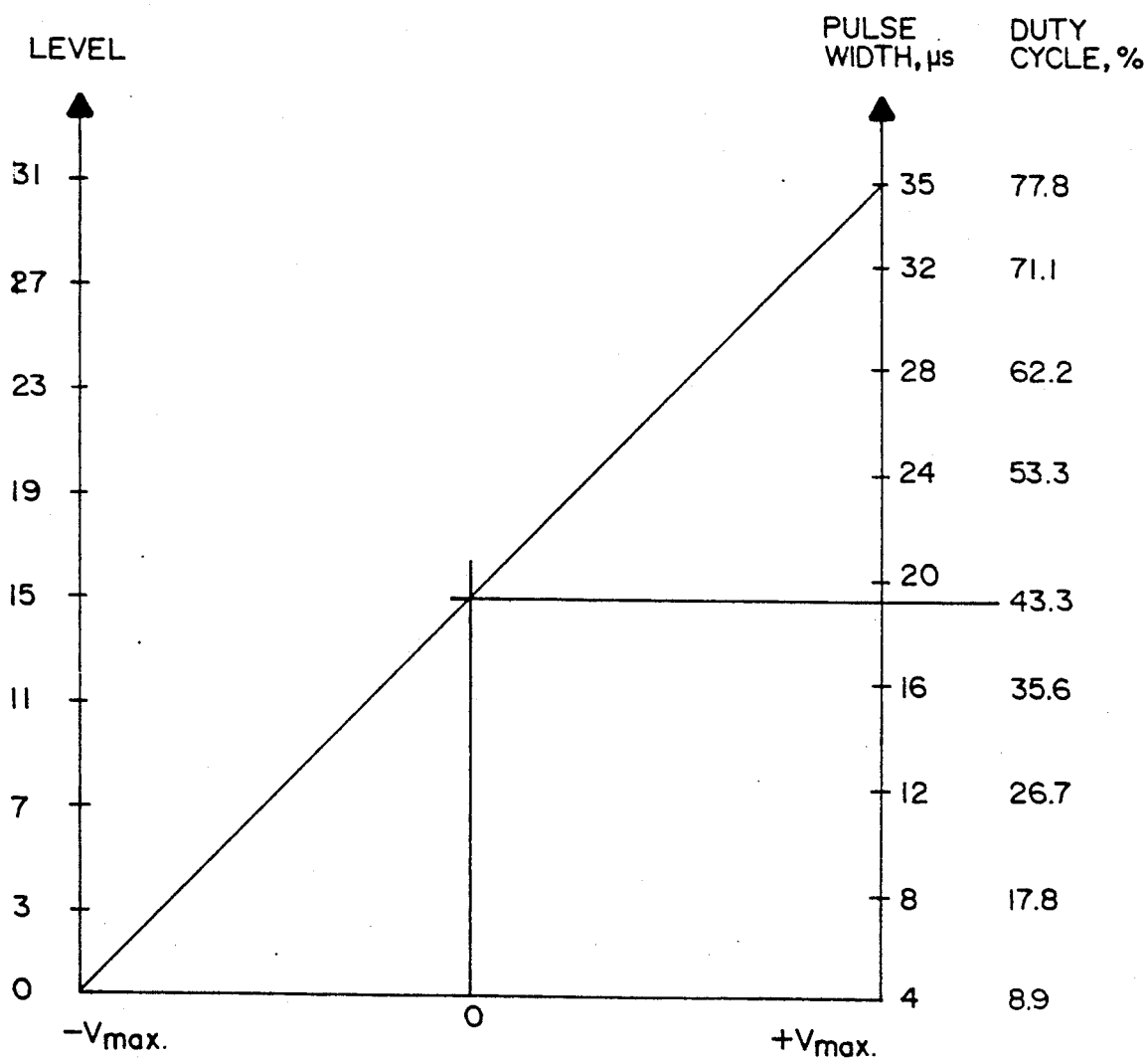
FIG. 3 is a diagram showing the relationship between duty cycles and audio signal levels.

FIGS. 2a through 2c illustrate the pulses applied to the speaker 16. The samples of speech output 12 are, in the preferred embodiment, encoded in sixteen positive and sixteen negative levels, for a total of thirty-two levels. As illustrated by FIGS. 3 and 2a, level 0 (the most negative audio signal level) corresponds to a pulse duration 4 μs. Because the pulse interval is always 45 μs (1/22.2 kHz), the speaker at this audio level is at logic "1" for 4 μs and at logic "0" for 31 μs, resulting in a duty cycle of 8.9%.

At level 31 (the most positive audio signal level), the speaker is at "1" for 35 μs and at "0" for 10 μs in the preferred embodiment (FIG. 2b), resulting in a duty cycle of 77.8%. Silence, i.e. zero audio signal, is produced by alternating pairs of 20 μs and 19 μs pulses (FIG. 2c), for an average duty cycle of 43.3%. Pulses are produced in pairs because each 11.1 kHz sample produces two 22.2 kHz carrier pulses.

It will be seen that the average voltage on the speaker coil varies at audio frequencies in accordance with the speech output sample values. Thus, in accordance with Nyquist's law of digital sampling, audio frequencies up to 5.55 kHz (11.1 kHz/2) can be faithfully reproduced by the speaker 16. This is more than enough for natural-sounding speech.

Referring now specifically to FIG. 1b, which shows the first embodiment of the invention, if the computer on which the software is to be used has two timers 18A and 18B (as do IBM and IBM clone PC's using 8253, 8254 or equivalent timer chips), the preferred method of generating the 22.2 kHz carrier is polling method. In that method, one of the timers (timer A) is instructed to count a 45 μs interval (i.e. 54 counts of timer's 1.2 MHz clock). After computing the value x of a waveform sample, the program executes the following routine twice:

1. Fetch and read current clock value on timer 18A; if >0, go to 1
2. Activate timer 18B to go to logic "1" for x units of time
3. Restore first timer to count down from top This approach has the advantage of making the sound generation totally independent of the CPU, while maintaining an accurate 22.2 kHz carrier frequency. The CPU 14 is thus able to carry out the computation of the sample value x during the first 45 μs interval, and to do necessary housekeeping tasks during the second 45 μs interval (the sampling rate is 11.1 kHz). This is important because although the universally used 8253, 8254 or equivalent timers have a standard 1.2 MHz clock rate, various CPU's have different clock rates; thus software using timed instructions will not run at the same speed on all PC's.

The above-described polling method would not at first glance be expected to work in practice, because timer 18A could reach zero anywhere within a five-instruction range, so that the actual count-down timing could vary between 42 μs and 48 μs. This would theoretically produce an annoying, audible subcarrier modulation at 11.1 kHz. It was found, however, that this modulation does not occur in practice because the timing error has a random distribution and therefore creates a low-level broadband noise rather than an 11 kHz tone. In practice, the signal-to-noise ratio is sufficiently high to make the generated noise level acceptable.

On initialization of the program, it is necessary to compute the polling overhead (which affects pitch) and to adjust the polling loop accordingly, to compensate for the individual operating speed (i.e. clock speed and memory access speed) of the CPU 14 on which the program is being run.

A second embodiment of the invention is illustrated in FIG. 1b. This embodiment is useful in faster computers such as the IBM AT, in which carrier synchronization is advantageously handled by an interrupt routine. In this routine, timer 18A continuously cycles through 45 μs. At the start of each 45 μs count, it generates an interrupt. The CPU 14 stops executing the producer code (i.e. determining the sample value x), saves its state, and executes the following subroutine:

1. Pick up sample at pointer location in output buffer 20
2. Increment pointer on every second subroutine execution
3. If pointer is at end of output buffer 20, set pointer to beginning of buffer 20
4. Output picked-up sample to timer 18B
5. Return The CPU 14 now continues to execute the producer code and stores the computed value x in the wrap-around output buffer 20. This system works only on computers which are fast enough so that the computation time of the values x average less than 45 μs, even though computation of individual samples may from time to time require more than 45 μs. It should be noted in this respect that the interrupt subroutine itself consumes a steady 7-8 μs of CPU overhead time, which is then not available for producer code execution.

In order to prevent the producer code execution from overtaking the output, the CPU 14 tests, after storing each value of x in the output buffer 20, whether the pointer is more than one location ahead of the most recent storage location. If it is not, producer code execution goes into a delay loop until the next sample has been picked up. The size of the output buffer 20 is determined by the longest producer code execution time, in such a way that a value x will be available for pick-up every 45 μs.

It will thus be seen that the present invention provides improved methods of producing clear, highly intelligible and natural-sounding speech on a DAC-less PC through the use of an all-software speech generating system. The methods described in connection with the two embodiments of this invention take advantage of the particular abilities of various types of computers to optimize the speech quality within each computer's capabilities.

We claim:

1. Apparatus for producing speech from digitally encoded speech samples without the use of a digital-to-analog converter, comprising:
   (a) speech computation means for producing a sequence of said digitally encoded samples;
   (b) a computer central processing unit;
   (c) a speaker; and
   (d) control means connected to said central processing unit and said speaker for applying to said speaker a square wave signal having a duty cycle controlled by said speech computation means in accordance with the values of said samples;
   (e) said square wave signal having a constant frequency in the ultrasonic range; and
   (f) said control means including:
      (i) first and second timers;
      (ii) means for causing said first timer to count a first predetermined time interval;

(iii) means for continually polling said first timer to detect the end of said time interval;

(iv) means for causing said second timer to count a second time interval when said end of said first interval is detected, said second interval being a function of said sample values, and to put out said square wave signal in response thereto.

2. Apparatus for producing speech from digitally encoded speech samples without the use of a digital-to-analog converter, comprising:

(a) speech computation means for producing a sequence of said digitally encoded samples;

(b) a computer central process unit;

(c) a speaker; and (d) control means connected to said central processing unit and said speaker for applying to said speaker a square wave signal having a duty cycle controlled by said speech computation means in accordance with the values of said samples;

(e) said square wave signal having a constant frequency in the ultrasonic range; and (f) said control means including:

(i) first and second timers;

(ii) a buffer for storing said sample values;

(iii) means for causing said first timer to cyclically count first predetermined time intervals;

(iv) means for interrupting said central processing unit in synchronization with said time intervals to apply a sample value stored in said buffer to said second timer so as to cause it to count a second interval which is a function of said stored sample value, and to put out said square wave signal in response thereto; and (v) means for causing sad central processing unit to compute and store and sample values in said buffer between interrupts.

3. The apparatus of claim 2, in which said buffer has a pointer, said stored sample is identified by said pointer, said apparatus further comprising means for incrementing said pointer to go from one sample to the next in such a manner as to cause each sample value to be applied to said second timer twice.

4. The apparatus of claim 3, in which said buffer is a wraparound buffer, said sample values are sequentially stored in said buffer, and computation of said sample values is suspended unless more than one storage space exists in said buffer between the most recently stored sample value and the sample identified by said pointer.

* * * * *